(12) United States Patent
Gulari et al.

(10) Patent No.: US 7,387,749 B2
(45) Date of Patent: *Jun. 17, 2008

(54) METHOD OF DELAMINATING AGGREGATED PARTICLES WITH A COATING AGENT IN A SUBSTANTIALLY SUPERCRITICAL FLUID

(75) Inventors: Esin Gulari, Detroit, MI (US); Gulay K. Serhatkulu, Taylor, MI (US); Kannan Rangaramanujam, Novi, MI (US)

(73) Assignee: Wayne State University, Detroit, MI (US)

( * ) Notice: Subject to any disclaimer, the term of this patent is extended or adjusted under 35 U.S.C. 154(b) by 625 days.

This patent is subject to a terminal disclaimer.

(21) Appl. No.: 10/783,060

(22) Filed: Feb. 20, 2004

(65) Prior Publication Data

US 2005/0187330 A1    Aug. 25, 2005

(51) Int. Cl.
*C04B 20/06* (2006.01)
(52) U.S. Cl. .................. 252/378 R; 523/216; 524/442; 524/445; 524/496
(58) Field of Classification Search ............ 252/378 R; 523/216; 524/442, 445, 496
See application file for complete search history.

(56) References Cited

U.S. PATENT DOCUMENTS

| | | | |
|---|---|---|---|
| 4,946,892 A | 8/1990 | Chung | |
| 5,877,005 A | 3/1999 | Castor et al. | |
| 6,469,073 B1 | 10/2002 | Manke et al. | |
| 6,753,360 B2 * | 6/2004 | Mielewski et al. | 523/216 |
| 7,157,517 B2 * | 1/2007 | Gulari et al. | 524/494 |
| 2002/0054995 A1 | 5/2002 | Mazurkiewicz | |
| 2002/0082331 A1 | 6/2002 | Mielewski et al. | |
| 2004/0033189 A1 | 2/2004 | Kaschak et al. | |
| 2004/0034151 A1 | 2/2004 | Kaschak et al. | |
| 2004/0106720 A1 * | 6/2004 | Jerome et al. | 524/445 |
| 2004/0127621 A1 * | 7/2004 | Drzal et al. | 524/424 |
| 2005/0014867 A1 | 1/2005 | Gulari et al. | |

FOREIGN PATENT DOCUMENTS

| | | |
|---|---|---|
| DE | 198 21 477 A1 | 11/1999 |
| DE | 100 36 336 A1 | 2/2002 |
| EP | WO 98/09926 | 3/1998 |
| EP | 1 247 829 A1 | 10/2002 |

OTHER PUBLICATIONS

Article from *Journal of Materials Chemistry*, by Andrew I Cooper, titled: "Polymer Synthesis and Processing Using Supercritical Carbon Dioxide," dated: Sep. 29, 1999, pp. 207-234.
Gulay K. Serhatkulu, et al., "A New Approach to Polymer Nanocomposites with Supercritical C02 Exfoliated Clays," Nov. 2002, https://engineeri ng.purdue.edu/C hE/Nano/NanoChm E/NSE_Topical_2 002/Synthesisan dProcessing ofNanocompositesA bstracts.htm.
Manuel Garcia-Leiner et al., "Polymer Nanocomposites Prepared By Supercritical Carbon Dioxide-Assisted Polymer Processing," 2004, Polymer Preprints, vol. 45(1), pp. 520-521.
K. Takahama et al., "Supercritical drying of $SiO_2$-$TiO_2$ sol-pillared clays," 1992, Journal of Materials Science 27, pp. 1297-1301.
Manuel Garcia-Leiner et al., "Processing of Intractable Polymers Using High-Pressure Carbon Dioxide," 2003, ANTEC, pp. 1610-1614.
Manuel Garcia-Leiner et al., "A Study of the Foaming Process of Polyethylene with High Pressure $CO_2$ in a Modified Extrusion System.", na.
Manuel Garcia-Leiner et al., "Drawing of UHMWPE Fibers in the Presence of Supercritical $CO_2$.", na.
Will Strauss et al., "Supercritical $CO_2$ Processed Polystyrene Nanocomposite Foams," May 2004, Journal of Cellular Plastics, vol. 40, pp. 229-241.
Mingjun Yuan et al., "Study of Injection Molded Microcellular Polyamide-6 Nanocomposites" Apr. 2004, Polymer Engineering and Science, vol. 44, No. 4, pp. 673-686.
Xiangmin Han et al., "Extrusion of Polystyrene Nanocomposite Foams with Supercritical $CO_2$," Jun. 2003, Polymer Engineering and Science, vol. 43, No. 6, pp. 1261-1275.
Satoshi Yoda, et al., "Preparation of a Platinum and Palladium/ Polyimide Nanocomposite Film as a Precursor of Metal-Doped Carbon Molecular Sieve Membrane via Supercritical Impregnation," Sep. 27, 2003 (revised: Mar. 8, 2004), Chem. Mater., vol. 16, No. 12, pp. 2363-2368.
Qian Zhao, et al., "Supercritical $CO_2$-Mediated Intercalation of PEO in Clay," Jul. 9, 2003 (revised Aug. 1, 2003), Macromolecules, vol. 36, No. 19, pp. 6967-6969.

(Continued)

Primary Examiner—Bernard Lipman
(74) Attorney, Agent, or Firm—Brinks Hofer Gilson & Lione (57) ABSTRACT

The present invention involves a method of delaminating aggregated particles of natural silicate, nanoplatelet, nanofiber, or nanotube structures. The method comprises diffusing a coating agent in a substantially supercritical fluid between the aggregated particles and catastrophically depressurizing the substantially supercritical fluid to form delaminated particles.

18 Claims, 4 Drawing Sheets

OTHER PUBLICATIONS

Tomas Berglof, et al., "Metsulfuron Methyl Sorption—Desorption in Field-Moist Soils," May 2, 2003, J. Agric. Food Chem., vol. 51, No. 12, pp. 3598-3603.

M. L. Occelli, et al., "Surface Area, Pore Volume Distributio, and Acidity in Mesoporous Expanded Clay Catalysts from Hybrid Density Functional Theory (DFT) and Adsorption Microcalorimetry Methods," Jun. 20, 2002 (final form Sep. 11, 2002), Langmuir, vol. 18, No. 25, pp. 9816-9823.

Ryo Ishii, et al., "A Comparison of Suprecritical Carbon Dioxide and Organic Solvents for the Intercalation of 4-Phenylazoaniline into a Pillared Clay Mineral," Apr. 26, 2002 (accepted Jul. 22, 2002), Journal of Colloid and Interface Science 254, pp. 250-256.

Masami Okamoto, et al., "Blaxial Flow-Induced Alignment of Silicate Layers in Polypropylene/Clay Nanocomposite Foam," Jun. 27, 2001 (revised Jul. 17, 2001), Nano Lett., vol. 1, No. 9, pp. 503-505.

Z. Ding, et al., "Characterization of Pore Structure and Coordination of Titanium in $TiO_2$ and $SiO_2$—$TiO_2$ Sol-Pillared Clays," Aug. 29, 2000 (accepted Feb. 27, 2001), Journal of Colloid and Interface Science 238, pp. 267-272.

Walter Fiddler, et al., "Potential Artifact Formation of Dioxins in Ball Clay During Supercritical Fluid Extraction," Apr. 25, 2000 (accepted Aug. 1, 2000), Journal of Chromatography A, 902, pp. 427-432.

Gerson L. V. Coelho, et al., "Desorption of Ethyl Acetate from Adsorbent Surfaces (Organoclays) by Supercritical Carbon Dioxide," Published on Web Nov. 10, 2000, Ind. Eng. Chem. Res., vol. 40, No. 1, pp. 364-368.

L. Morselli, et al., "Supercritical Fluid Extraction for the Determination of Petroleum Hydrocarbons in Soil," © 1999, Journal of Chromatography A, 845, pp. 357-363.

A. C. Pierre, et al., DLVO Theory and Clay Aggregate Architectures Formed with $AICl_3$, Sep. 17, 1998 (accepted Oct. 26, 1998), Journal of the European Ceramic Society 19, pp. 1615-1622.

Lionel Spack, et al., "Comparison of Supercritical Fluid Extraction (SFE), Soxhlet and Shaking Methods for Pendimethalin Extraction From Soils: Effect of Soil Properties and Water Content," © 1998, Journal of Contaminant Hydrology 33, pp. 171-185.

Shijiang Liang, et al., "Extraction of Petroleum Hydrocarbons from Soil Using Supercritical Argon," Feb. 1, 1998, Analytical Chemistry, vol. 70, No. 3, pp. 616-622.

R. Montero-Vazquez, et al., "Kinetics of the Extraction of Pyrene Using Carbon Dioxide in Dense Phase," Feb. 20, 2002, (© 2003), Chemosphere 53, pp. 789-793.

Carl D. Saquing, et al., "Preparation of Platinum/Carbon Aerogel Nanocomposites Using A Supercritical Deposition Method," Feb. 2, 2004 (© Apr. 5, 2004), J. Phys. Chem. B 108, pp. 7716-7722.

David L. Tomasko, et al., "Supercritical Fluid Applications in Polymer Nanocomposites," Oct. 6, 2003 (© 2003), Current Opinion in Solid State and Materials Science 7, pp. 407-412.

Kelly S. Morley, et al., "Supercritical Fluids: A Route to Palladium-Aerogel Nanocomposites," Sep. 11, 2003 (© 2004), J. Mater. Chem., 14, pp. 1212-1217.

Xianbo Hu, et al., "Enhanced Crystallization of Bisphenol-A Polycarbonate by Nano-Scale Clays in the Presence of Supercritical Carbon Dioxide," Aug. 12, 2003 (® 2004), www.sciencedirect.com, pp. 2334-2340.

Mihaela Popovici, et al., "Ultraporous Single Phase Iron Oxide-Silica Nanostructured Aerogels from Ferrous Precursors," Jun. 19, 2003 (published 2004), Langmuir, vol. 20, No. 4, pp. 425-1429.

Brady J. Clapsaddle, et al., "Siliicon Oxide in an Iron (III) Oxide Matrix: The Sol-Gel Synthesis and Characterization of Fe-Si mixed Oxide Nanocomposites that Contain Iron Oxide As the Major Phase," Apr. 9, 2003 (© 2003), Journal of Non-Crystalline Solids, vol. 331, pp. 190-201.

Youhei Fujimoto, et al., "Well-Controlled Biodegradable Nanocomposite Foams: From Microcellular to Nanocellular," 2003, Macromolecular Rapid Communications, vol. 24, pp. 457-461.

Azusa Kameo, et al., "Preparation of Noble Metal Nanoparticles in Supercritical Carbon Dioxide," Jul. 2, 2002 (accepted Sep. 26, 2002), Colloids and Surfaces A: Physicochem. Eng. Aspects, vol. 215, pp. 181-189.

Adam Zerda, et al., "Highly Concentrated, Intercalated Silicate Nanocomposites: Synthesis and Characterization," Aug. 19, 2002 (published Feb. 11, 2003), Macromolecules, vol. 36, pp. 1603-1608.

Jianxin Zhang, et al., "Preparation of a Poly (Methyl Methacrylate)/ Ultrahigh Molecular Weight Polyethylene Blend Using Supercritical Carbon Dioxide and the Identification of a Three-Phase Structure: An Atomic Force Microscopy Study," Dec. 28, 2001 (published Oct. 5, 2002), Macromolecules, vol. 35, pp. 8869-8877.

Maria F. Casula, et al., "FeCo-$SiO_2$ Nanocomposite Aerogels by High Temperature Supercritical Drying," Mar. 28, 2002( accepted Feb. 26, 2002), Journal of Materials Chemistry, vol. 12, pp. 1505-1510.

Li. Casas, et al., "Silica Aerogel-Iron Oxide Nanocomposites: Structural and Magnetic Properties," 2001, Journal of Non-Crystalline Solids, vol. 285, pp. 37-43.

Catherine A. Morris, "Modifying Nanoscale Silica With Itself: A Method to Control Surface Properties of Silica Aerogels Independently of Bulk Structure," 2001, Journal of Non-Crystalline Solids, vol. 285, pp. 29-36.

Ken Johns, "Supercritical Fluids-A Novel Approach to Magnetic Media Production?," © 1999, Tribology International, vol. 31, No. 9, pp. 485-490.

James J. Watkins, et al., "Polymer/Metal Nanocomposite Synthesis in Supercritical $CO_2$," Jul. 10, 1995 (received Sep. 27, 1995), Chemistry of Materials, vol. 7, No. 11, pp. 1991-1994.

R. Montero-Vazquez, et al., "Kinetics of the Extraction of Pyrene Using Carbon Dioxide in Dense Phase," May 2, 2003 (accepted May 13, 2003), Chemosphere, vol. 53, pp. 789-793.

Valeriy V. Ginzburg, et al., "Theoretical Phase Diagrams of Polymer/Clay Composites: The Role of Grafted Organic Modifiers," Aug. 9, 1989 (received Nov. 3, 1999), Macromolecules, vol. 33, No. 3, pp. 1089-1099.

* cited by examiner

METHOD OF DELAMINATING AGGREGATED PARTICLES WITH A COATING AGENT IN A SUBSTANTIALLY SUPERCRITICAL FLUID

FIELD OF THE INVENTION

The present invention relates to delaminating aggregated particles of silicate, nanoplatelet, nanofiber, or nanotube structures. The delaminated structures are useful for mixing with a polymer to produce a reinforced polymer having improved properties.

BACKGROUND OF THE INVENTION

The use of plastics in various industries has been steadily increasing due to their light weight and continual improvements to their properties. For example, in the automotive industry, polymer-based materials may comprise a significant portion, e.g., at least 15 percent, of a given vehicle's weight. These materials are used in various automotive components, such as, interior and exterior trim and side panels. As the industry seeks to improve fuel economy, more steel and aluminum parts may be targeted for replacement by polymer-based materials.

For example, improvements in the mechanical properties of polymers are desired in order to meet more stringent performance requirements. Such mechanical properties include stiffness, dimensional stability, modulus, heat deflection temperature, barrier properties, and rust and dent resistance. Improved mechanical properties may reduce manufacturing costs by reducing the part thickness and weight of the manufactured part and the manufacturing time thereof.

There are a number of ways to improve the properties of a polymer, including reinforcement with particulate fillers or glass fibers. It is known that polymers reinforced with nanometer-sized platelets or particles of layered silicates or clay can significantly improve the mechanical properties at much lower loading than conventional fillers. (See U.S. Pat. No. 6,469,073 issued to Manke et al. (2002).) This type of composite is termed a "nanocomposite." More specifically, polymer-silicate nanocomposites are compositions in which nano-sized particles of a layered silicate, e.g., montmorillonite clay, are dispersed into a thermoplastic or a thermoset matrix. The improvement in mechanical properties of nanocomposites is believed to be due to factors such as the increased surface area of the particles.

In its natural state, clay is made up of stacks of individual particles held together by ionic forces. The spacing between the layers is in the order of about 1 nanometer (nm) which is smaller than the radius of gyration of typical polymers. Consequently, there is a large entropic barrier that inhibits the polymer from penetrating this gap and intermixing with the clay. (V. Ginzburg et al., *Macromolecules*, 200, 33, 1089-1099.) Organically treated clays have been achieved by performing intercalation chemistry to exchange a naturally occurring inorganic cation with a bulky organic cation.

In one process, a number of steps are involved in producing reinforced polymers or polymer nanocomposites. The first step involves a process of conditioning or preparing the clay to make it more compatible with a selected polymer. The conditioning step is performed because the clay is generally hydrophilic and many polymer resins of interest are hydrophobic, thus rendering the two relatively incompatible. A cation exchange is then performed to exchange a naturally occurring inorganic cation with an organic cation. In addition, this process may increase the interlayer spacing between each particle, lessening the attractive forces between them. This allows the clay to be compatible with the polymer for subsequent polymerization or compounding. This preparatory step is known as "cation exchange." Typically, cation exchange is performed with a batch reactor containing an aqueous solution wherein an organic molecule, usually an alkyl ammonium salt, is dissolved into water along with the clay particles. The reactor is then heated. Once ion exchange takes place, the clay particles precipitate out and are then dried.

Depending on the polymer, a monomer may be further intercalated into the clay galleries. The organically modified clay is then ready for melt compounding to combine the clay with the polymer to make a workable material. Both the polymerization step and the melt compounding step involve known processing conditions in which the particles disperse and exfoliate in the polymer.

Recently, near-critical fluids (see U.S. Pat. No. 5,877,005 to Castor et al.) supercritical fluids have been proposed as candidate media for polymerization processes, polymer purification and fractionation, and as environmentally preferable solvents for coating applications and powder formation. (F. C. Kirby, M. A. McHugh, *Chem. Rev.*, 99, 565-602, (1999).) Moreover, supercritical carbon dioxide has been used as a processing aid in the fabrication of composite materials. (T. C. Caskey, A. S. Zerda, A. J. Lesser, *ANTEC*, 2003, 2250-2254 (2000).) Generally, any gaseous compound becomes supercritical when compressed to a pressure higher than its critical pressure (Pc) above its critical temperature (Tc). One of the unique characteristics which distinguish supercritical fluids from ordinary liquids and gases is that some properties are tunable simply by changing the pressure and temperature. For example, while maintaining liquid characteristic densities constant, supercritical fluids generally experience faster diffusivity and lower viscosity than a liquid.

Supercritical fluids have been used for delaminating layered silicate materials. (See U.S. Pat. No. 6,469,073 issued to Manke et al. (2002) and U.S. Patent Application Publication No. US 2002/0082331 A1 to Mielewski et al. (2002).) For example, in U.S. Pat. No. 6,469,073, original layered clay structures are swelled or intercaled with supercritical fluid medium to increase the spacing and weakening the bonds between the layers. Upon depressurization, the drastic volume change of the fluid mechanically spreads the layers pushing them apart. The depressurization results in the delaminated structure.

However, there are at least three possible scenarios following the depressurization step. If the layered structure is maintained, the spacing between the layers may increase, may remain the same due to reformation of the weak bonds, or may decrease due to the relaxation and reorganization of organic moieties.

Thus, there is a need to more effectively delaminate particles of silicate, nanoplatelet, nanofiber, or nanotube structures which may be processed with polymers to enhance properties thereof.

BRIEF SUMMARY OF THE INVENTION

The present invention generally provides a system and method of delaminating aggregated particles of natural silicate, nanoplatelet, nanofiber, or nanotube structures with a coating agent solubilized in a substantially supercritical fluid. The particles may be implemented to reinforce materials such as polymers for enhanced mechanical, chemical, barrier and fire retardancy properties of the polymer.

In one embodiment, the method comprises diffusing a coating agent in a substantially supercritical fluid between the aggregated particles. The method further comprises catastrophically depressurizing the substantially supercritical fluid to form delaminated particles.

In another embodiment, the present invention includes a method of preparing a reinforced polymer. The method comprises diffusing a coating agent in a substantially supercritical fluid between aggregated particles of silicate, nanoplatelet, nanofiber, or nanotube structures defining contacted particles. The method further comprises catastrophically depressurizing the contacted particles to exfoliate the contacted particles and reduce reaggregation of the structures. The coating agent is precipitated from the substantially supercritical fluid and deposited on the contacted particles during depressurization defining delaminated particles. The method further comprises processing the delaminated particles with a miscible polymer or an immiscible polymer to form delaminated particle-polymer nanocomposites defining the reinforced polymer.

In another embodiment, the method comprises diffusing aggregated particles of a silicate, nanoplatelet, nanofiber, or nanotube structures with a coating agent solubilized in a substantially supercritical fluid to intercalate the coating agent between the aggregated particles defining contacted particles. The method further comprises catastrophically depressurizing the contacted particles to exfoliate the contacted particles and reduce reaggregation of the structures. The coating agent is precipitated from the depressurized fluid and deposited on the contacted particles during depressurization, defining delaminated particles. The method further comprises processing the delaminated particles with one of a missible polymer or an immisible polymer to form delaminated particle-polymer nanocomposites and applying an external field to orient the delaminated particles in the film defining the reinforced polymer.

In yet another embodiment, the present invention includes a delaminated silicate, nanoplatelet, nanofiber, or nanotube structure coated with a coating agent and substantially singly dispersed apart from each other.

In still another embodiment, the present invention includes delaminated particle-polymer nanocomposite comprising delaminated particles of silicate, nanoplatelet, nanofiber, or nanotube structures coated with a coating agent and dispersed in a polymer.

Further aspects, features, and advantages of the invention will become apparent from consideration of the following description and the appended claims when taken in connection with the accompanying drawings.

DETAILED DESCRIPTION OF THE INVENTION

An example of the present invention comprises a method of delaminating aggregated particles with a coating agent solubilized in a substantially supercritical fluid, e.g., a supercritical fluid or a near-critical fluid. The method comprises providing aggregated particles and providing the coating agent solubilized in the substantially supercritical fluid. In one embodiment, the aggregated particles comprise natural layered silicate, layered nanoplatelet, aggregated nanofiber, or aggregated nanotube structures. Suitable particles for use in the present invention has one or more of the following properties: layered or aggregated individual particles in powder form having a size between about 2 nm and 1 mm, a specific gravity of about 1 to 4, and perpendicular space between each other of about 2 to 30 angstroms.

As is known, if a substance is heated and is maintained above its critical temperature, it becomes impossible to liquefy it with pressure. When pressure is applied to this system, a single phase forms that exhibits unique physicochemical properties. This single phase is termed a supercritical fluid and is characterized by a critical temperature and critical pressure. Supercritical fluids have offered favorable means to achieve solvating properties, which have gas and liquid characteristics without actually changing chemical structure. By proper control of pressure and temperature, a significant range of physicochemical properties (density, diffusivity, dielectric constants, viscosity) can be accessed without passing through a phase boundary, e.g., changing from gas to liquid form.

As is known, a near critical fluid may have a parameter such as a pressure or a temperature slightly below the pressure or the temperature of its critical condition. For example, the critical pressure of carbon dioxide is 73.8 bar and its critical temperature is 301K. At the given temperature, carbon dioxide may have a near critical pressure of between about 3.0 bar and 73.7 bar. At a given pressure, carbon dioxide may have a near critical temperature of between 100K and 300K. A fluid at its near critical condition typically experiences properties such as enhanced compressibility and low surface tension to name a few.

The substantially supercritical fluid of the present invention is preferably a supercritical fluid. The supercritical fluid is preferably carbon dioxide which may exist as a fluid having properties of both a liquid and a gas when above its critical temperature and critical pressure. Carbon dioxide at its supercritical conditions has both a gaseous property, being able to penetrate through many materials and a liquid property, being able to dissolve materials into their components. Although the supercritical fluid is preferably carbon dioxide, the supercritical fluid may comprise other suitable fluids such as methane, ethane, nitrogen, argon, nitrous oxide, alkyl alcohols, ethylene propylene, propane, pentane, benzene, pyridine, water, ethyl alcohol, methyl alcohol, ammonia, sulfur hexaflouride, hexafluoroethane, fluoroform, chlorotrifluoromethane, or mixtures thereof.

It is understood that the substantially supercritical fluid is preferably a supercritical fluid. However, a near-critical fluid may be used in lieu of the supercritical fluid which is referred to hereafter.

A coating agent in accordance with the present invention comprises compounds which can be solubilized in the supercritical fluid to diffuse between the layered silicate, layered nanoplatelet, aggregated nanofiber, or aggregated nanotube structures. Generally, the coating agent may include polymers, oligomers, monomers, and oils or mixtures thereof soluble in the supercritical fluid. In one embodiment, the coating agent is poly-(dimethylsiloxane) ("PDMS") having a weight average molecular weight of preferably between about 500 and 300000. Other suitable coating agents may be used such as poly-(tetrafluoroethylene-co-hexafluoropropylene), poly-(perfluoropropylene oxide), poly-(diethylsiloxane), poly-(dimethylsilicone), poly-(phenylmethylsilicone), perfluoroalkylpolyethers, chlorotrifluoroethylene, and bromotrifluoroethylene, poly (vinly methyl ether) (PVME), polyethers.

The aggregated particles and the coating agent are preferably placed in a compartment of a high-pressurized vessel isolatable from the atmosphere. In this embodiment, the aggregated particles comprise about 10 to 90 weight percent and the coating agent comprises about 90 to 10 weight percent of material placed in the vessel. The weight ratio of aggregated particles to coating agent is preferably at least about 1:10. Then, the compartment is sealed off from the atmosphere. The compartment may be isolated by any conventional means.

When carbon dioxide is used, high-pressurized carbon dioxide is then introduced into the compartment and is pressurized in the vessel to above about 7.24 MPa to 70 MPa, and preferably to above about 7.58 MPa. Then, heat is applied to the vessel to heat the vessel to a temperature above about 35 to 150 degrees Celsius, and preferably to above about 70 degrees Celsius. These conditions define a supercritical condition of carbon dioxide whereby the coating agent solubilizes in the supercritical carbon dioxide. However, other ranges may be used for other supercritical fluids without falling beyond the scope or spirit of the present invention. Pressurizing and heating the particles with the supercritical fluid may be accomplished by any conventional means.

When the coating agent solubilizes in the supercritical fluid, the coating agent diffuses between the aggregated particles, defining contacted particles. It is to be understood that the term "diffuses" mentioned above may be equated to "expands" or "swells" with respect to the coating agent and the aggregated particles. In this embodiment, the vessel is heated by any conventional heating jacket or electrical heating tape disposed about the vessel. Moreover, diffusing the coating agent between the aggregated particles includes maintaining diffusion for between about 10 minutes to 24 hours at supercritical conditions and preferably 3 hours, to produce contacted particles.

The method further comprises catastrophically depressurizing the contacted particles to precipitate the coating agent from the supercritical fluid and to deposit the coating agent on the contacted particles, defining delaminated particles. During catastrophic depressurization, the supercritical fluid expands which mechanically intercalates the aggregated particles and the coating agent precipitates from the depressurized fluid onto the layers. After catastrophic depressurization, the contacted particles are exfoliated such that the particles are substantially delaminated and disordered, preventing reaggregation of the structures.

In this embodiment, the "intercalation" of the particles is understood to mean when the coating agent or supercritical fluid moves into the gallery spacing between the particles, but causes less than about 20-30 Å of separation between the particles. Moreover, it is also to be understood that "exfoliation" or "delamination" occurs when the coating agent or supercritical fluid further separates the clay platelets by at least about 80 Å.

In this embodiment, depressurizing comprises immediately depressurizing the vessel down to a considerably lower pressure, preferably ambient pressure. This may be accomplished in a time period of between about 5 and 30 seconds, and preferably 15 seconds. The pressure decrease may be accomplished by opening the compartment to the atmosphere. In this embodiment, as depressurizing occurs, heating is stopped, thus lowering the temperature of the particles. As immediate depressurization occurs, the particles are delaminated or substantially singly dispersed apart from each other.

Although not wanting to be limited to any particular theory, it is believed that the low viscosity and high diffusivity of the supercritical fluid allows the coating agent solubilized therein to become disposed or intercalated between the particles during supercritical conditions, providing an increase in interlayer spacing therebetween. It is further believed that, upon depressurization, the supercritical fluid disposed interstitially between the particles force the particles to exfoliate or delaminate from each other, and the coating agent previously solubilized in the supercritical fluid precipitates therefrom to deposit on the contacted particles, preventing reaggregation of the structures. That is, the coating agent precipitates from the supercritical fluid and attaches to each of the delaminated particles. Thus, a substantially uniformly dispersed amount of delaminated particles results.

Thereafter, the delaminated particles may be prepared for use in several applications. For example, the delaminated particles may be mixed or incorporated with a polymer to form a particle-polymer nanocomposite having high surface area contact between the particles and the polymer. The particle-polymer nanocomposites may comprise between about 0.1 and 40 weight percent of the particles of silicate, nanoplatelet, nanofiber, or nanotube structures. Moreover, the particles contained in the particle-polymer nanocomposites have a relatively high surface area to weight ratio. The high surface area substantially enhances the polymer by an increase in interfacial interactions while having little added weight. It has been found that polymers reinforced with delaminated particles of silicate, nanoplatelet, nanofiber, or nanotube structures provide substantially increased chemical resistance, heat conductivity, barrier, fire retardancy, and mechanical properties along with lower manufacturing time and cost.

The polymer may be any suitable polymer, such as the following plastics: polyvinyl chloride (PVC), polyethylene terephthalate, polyacrylonitrite, high density polyethylene (HDPE), polyethylene terephthalate (PETE), polyethylene triphallate (PET), polycarbonate, polyolefins, polypropylene, polystyrene, low density polyethylene (LDPE), polybutylene terephthalate, ethylene-vinyl acetate, acrylic-styrene-acrylonitrile, melamine and urea formaldehyde, polyurethane, acrylonitrile-butadiene-styrene, phenolic, polybutylene, polyester, chlorinated polyvinyl chloride, polyphenylene oxide, epoxy resins, polyacrylics, polymethyl methacrylate, acetals, acrylics, amino resins cellulosics, polyamides, phenol formaldehyde, nylon, or polytetrafluroethylene.

Particle-polymer nanocomposites such as those described above may be manufactured by disposing the delaminated particles and the polymer using processing. The processing may be performed using a conventional mixer, extruder, injection molding machine, fiber spinning, compounding, solvent casting known in the art which has been used to mix finely divided reinforcing particles with polymer to form a particle-polymer nanocomposites.

Figure 1:
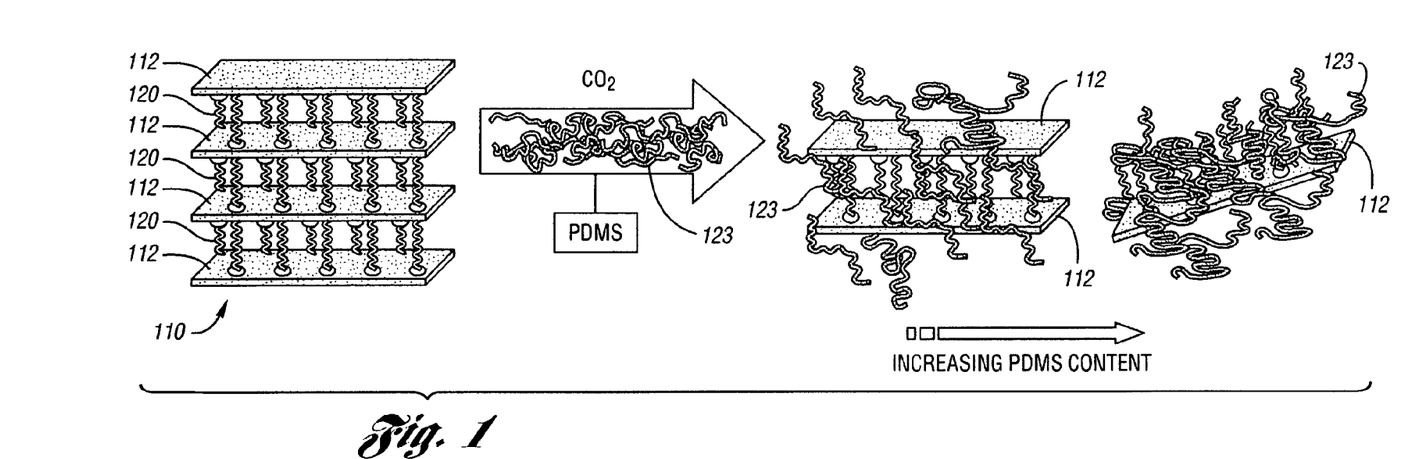
FIG. 1 is a perspective view of a schematic representation of diffusing aggregated particles of natural silicate, nanoplatelet, nanofiber, or nanotube structures by a coating agent solubilized in a supercritical fluid.

FIG. 1 depicts a schematic representation of aggregated particles 110 of layered nanoplatelet structures prior to diffusing a coating agent in the supercritical fluid between the particles and after diffusing coating agent in the supercritical fluid between the aggregated particles. FIG. 1 shows aggregated particles 112 with affinity via weak bonds 120 therebetween. After solubilizing in the supercritical fluid, the coating agents 123 diffuse between the aggregated particles 112. This may also be referred to as "swelling" or "expanding" the particles of layered nanoplatelet structure with the supercritical fluid to intercalate the coating agent between the particles. As shown, coating agent diffusion or swelling between the particles increases, as coating agent concentration increases within the supercritical fluid.

Figure 2A:
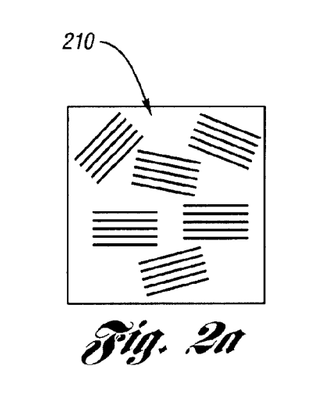
FIG. 2a is a cross-sectional view of a conceptual image of aggregated particles of silicate, nanoplatelet, nanofiber, or nanotube structures before processing with a coating agent in a supercritical fluid in accordance with one embodiment of the present invention.
Figure 2B:
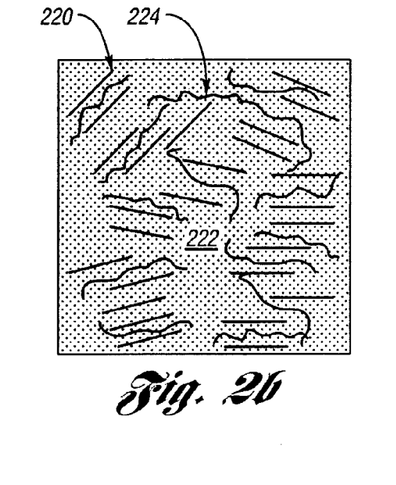
FIG. 2b is a cross-sectional view of a conceptual image of the particles when diffused with a coating agent in a supercritical fluid.
Figure 2C:
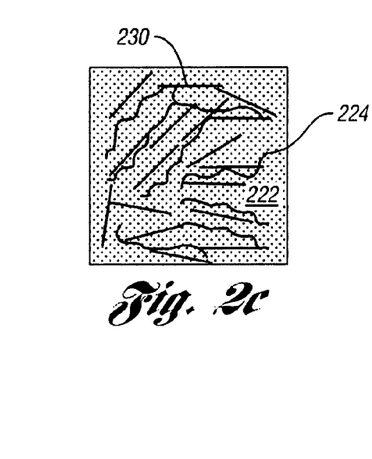
FIG. 2c is a cross-sectional view of a conceptual image of the particles after depressurization from supercritical conditions.

FIGS. 2a-2c illustrate conceptual images of supercritical fluid processing of aggregated particles of silicate or nanoplatelet structures. FIG. 2a depicts aggregated particles 210 before being diffused by the coating agent in the supercritical fluid. As mentioned, the particles 210 are held together by chemical bonds. FIG. 2b illustrates contacted particles 220 diffused by the coating agent 224 in the supercritical fluid 222 between the contacted particles. FIG. 2c depicts delaminated particles 230 after catastrophic depressurization wherein the coating agent 224 is precipitated from the depressurized fluid 222 and deposited on the delaminated particles 230.

Figure 3:
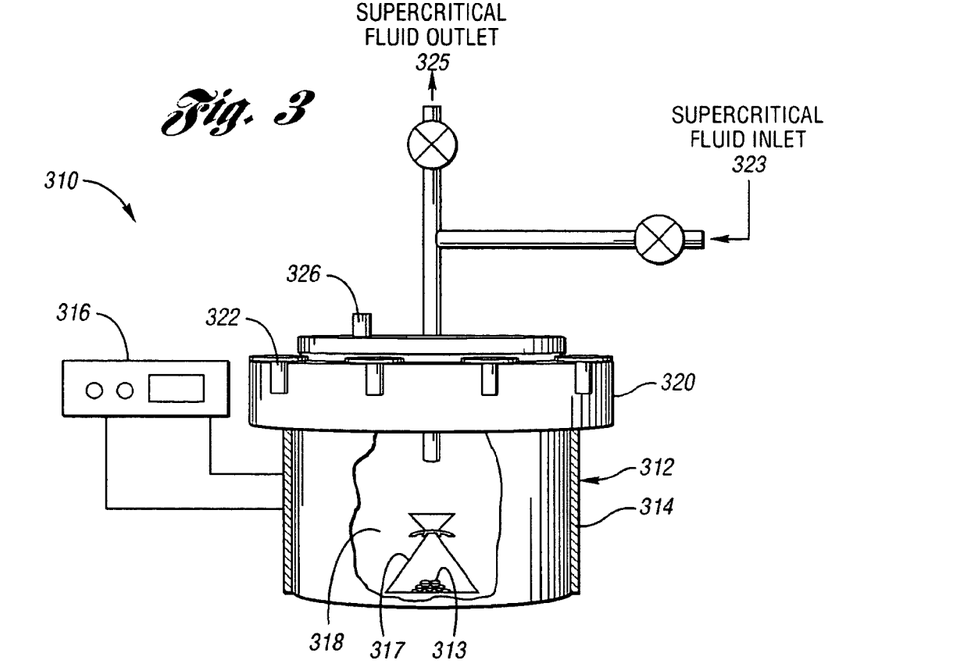
FIG. 3 is a side view of a system for delaminating aggregated particles of silicate, nanoplatelet, nanofiber, or nanotube structures in accordance with one embodiment of the present invention.

As shown in FIG. 3, the method mentioned above may be completed with the use of a number of apparatus. In this embodiment, a system 310 comprises a high-pressurized vessel 312 with a heating jacket 314 and temperature controller 316. The vessel 312 may be any conventional pressure vessel configured to receive aggregated particles and a coating agent 313, preferably but not necessarily in a porous membrane 317, and supercritical fluid from any conventional source. The vessel 312 has the capability of maintaining high pressure and high temperature therein. In a preferred embodiment, the vessel 312 comprises an isolatable compartment 318 which receives aggregated particles and the coating agent 313 and vents to the atmosphere by any suitable means such as a ball valve. The system 310 may further comprise a removable top 320 to allow placement of the aggregated particles and the coating agent in the vessel 312. Thus, the removable top 320 may comprise a ring and security clamps 322 for securing the top to the vessel. The system 310 may further comprise piping means for a supercritical fluid inlet 323 and a supercritical fluid outlet 325. Moreover, the system may also include any suitable depressurization mechanism such as a blow-off valve 326 capable of releasing pressure from the vessel. The source of supercritical fluid may be any conventional fluid source such as a high-pressure gas cylinder containing the fluid of choice.

Figure 4:
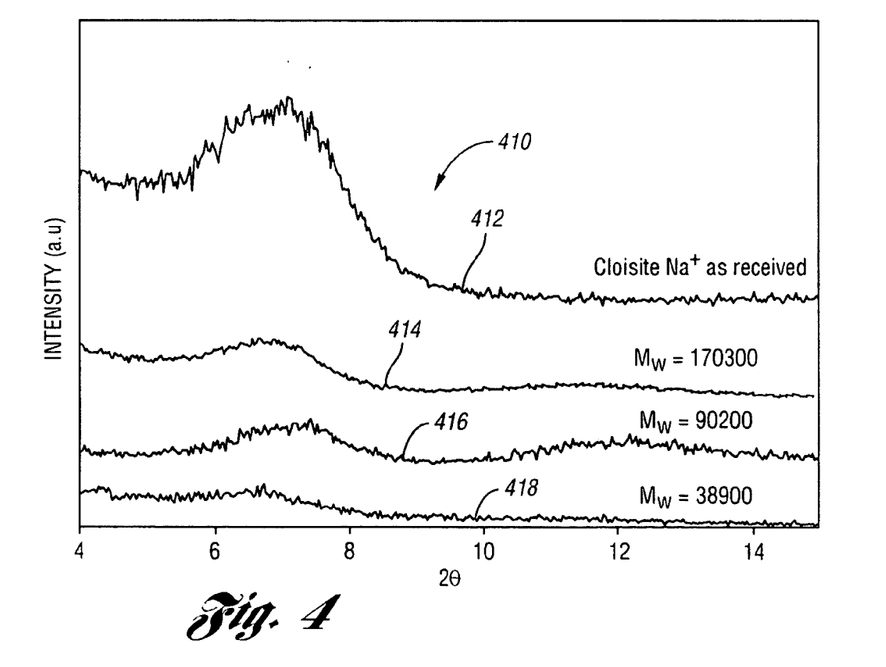
FIG. 4 is a plot of x-ray diffraction patterns of treated particles with a supercritical fluid having a coating agent at different molecular weights.

FIG. 4 illustrates plots of x-ray diffraction patterns 410 of treated and untreated depressurized aggregated particle samples (Na+-montmorillonite). Clay to coating agent As shown, pattern 412 of untreated aggregated particles without the coating agent (PDMS) provides a well-defined peak indicating a substantially ordered structure. On the other hand, patterns 414, 416, and 418 of treated delaminated particles provide diffraction patterns, indicating a disordered morphology. Pattern 414 is a plot of the x-ray diffraction pattern of delaminated particles with PDMS at a weight average molecular weight of 170300. Pattern 416 is a plot of the x-ray diffraction pattern of delaminated particles with PDMS at a weight average molecular weight of 90200. Pattern 418 is a plot of the x-ray diffraction pattern of delaminated particles with PDMS at a weight average molecular weight of 38900.

Figure 5:
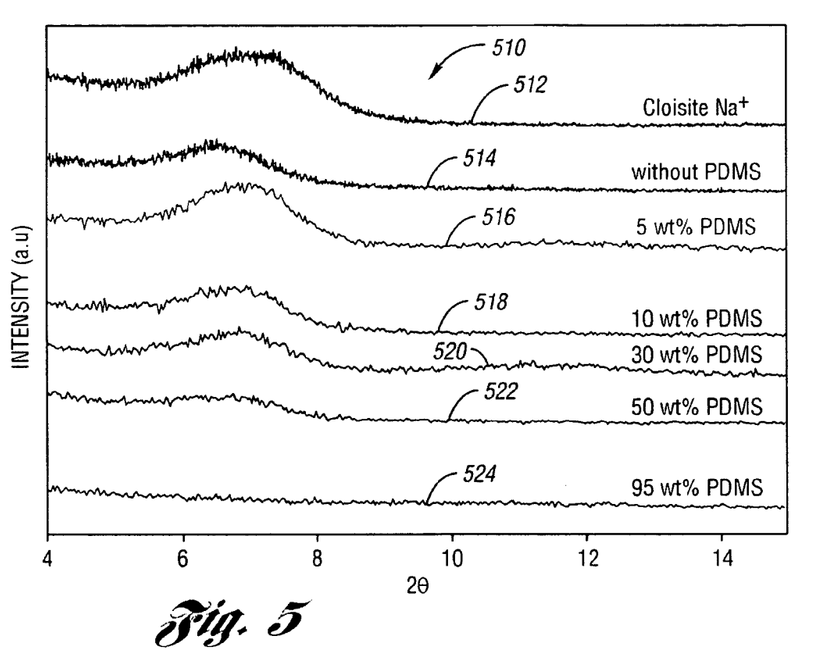
FIG. 5 is a plot of x-ray diffraction patterns of untreated and treated particles of silicate, nanoplatelet, nanofiber, or nanotube structures having different amounts of coating agent.

FIG. 5 illustrates plots of x-ray diffraction patterns 510 of untreated and treated depressurized particle samples (Na+-montmorillonite) with varied amounts of the coating agent in a supercritical fluid. The processing periods (3 hours) and the PDMS weight average molecular weight (38900) were kept constant. As shown in FIG. 5, broader peaks and decreased ordered structures are generally observed as the amounts of the coating agent are increased. Pattern 512 is a plot of the x-ray diffraction pattern as received Na+-montmorillonite and pattern 514 is a plot of the x-ray diffraction pattern without coating agent. Patterns 516, 518, 520, 522, and 524 are plots of the x-ray diffraction patterns using PDMS at increasing amounts of 5% wt, 10% wt, 30% wt, 50% wt, and 95% wt PDMS, respectively. Thus, FIG. 5 indicates that increasing the PDMS loads provides an increased disordered morphology.

As mentioned above, a mixer or a processing system may be used to mix the delaminated particles with a polymer to form a particle-polymer nanocomposites. It is to be noted that it has been unexpectedly found that the delaminated particles may be mixed with any polymer regardless of the miscibility of the coating agent with a host polymer. For example, in one embodiment, the coating agent is PDMS. Moreover, poly-(vinyl methyl ether) (PVME) is a polymer known in the art to be immiscible with PDMS. However, when the delaminated particles with a PDMS coating agent is mixed with PVME, the delaminated particles are substantially uniformly dispersed within the polymer.

Figure 6:
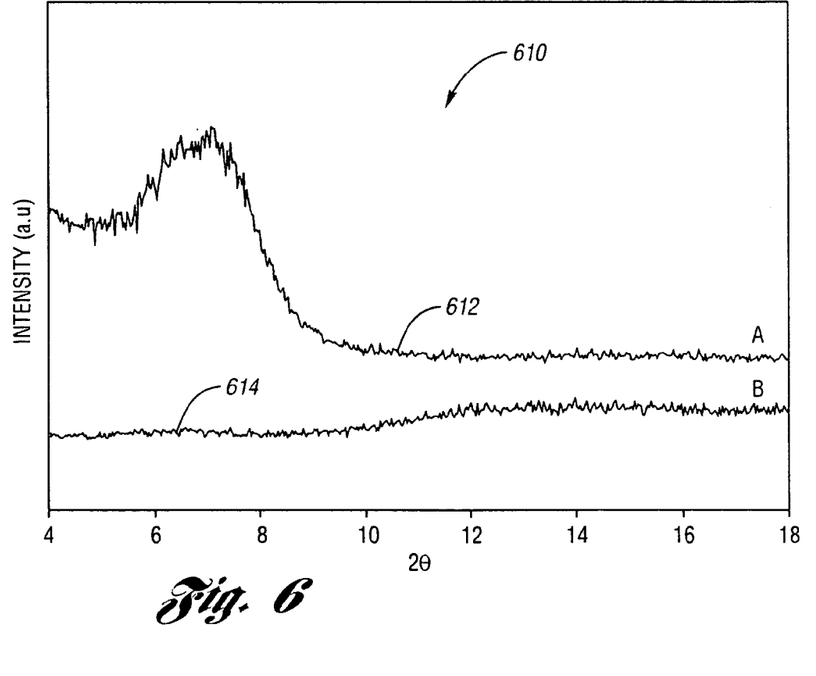
FIG. 6 is a plot of x-ray diffraction patterns of untreated and treated particles with a coating agent and mixed with an immiscible polymer.

FIG. 6 illustrates a plot of x-ray diffraction patterns 610 of untreated and treated aggregated particle samples (Na+-montmorillonite) with PDMS, PVME, and a supercritical fluid. Pattern 612 is a plot of the x-ray diffraction pattern of untreated particle samples as received. Pattern 614 is a plot of the x-ray diffraction pattern of the particle samples after being coated with PDMS first and mixed with PVME in the presence of supercritical fluid. Although PDMS and PVME are immiscible with each other, FIG. 6 shows that the efficiency of exfoliations is not affected by using both PDMS and PVME to treat the particle samples. Thus, it has been unexpectedly found that the miscibility of the coating agent with a host polymer is not substantially relevant to achieve exfoliation of the particle sample.

It is also to be noted that the mixer may be any conventional system, e.g., an extruder or injection molding machine, configured to receive delaminated particles and a polymer into which the delaminated particles are mixed and by means of which a particle-polymer nanocomposites is produced. The particles may be mixed by one or a combination of the following processes: extruding, molding, melt mixing, solution casting, compounding, fiber spinning, supercritical fluid processing or combinations thereof.

After mixing, the reinforced polymer may undergo further property enhancement processes. In one embodiment, the method may include a process of applying an external field on the reinforced polymer to orient the delaminated particles uniaxially or multiaxially therein. The process of applying an external field may include any suitable means such as shear flowing, extensional flowing, mechanical procuring, electrical field procuring, magnetic field procuring, or combinations thereof. Applying an external field provides orientation of the delaminated particles in an uniaxial or a multiaxial configuration to further enhance properties of the reinforced polymer, e.g., sealant or barrier properties.

Figure 7:
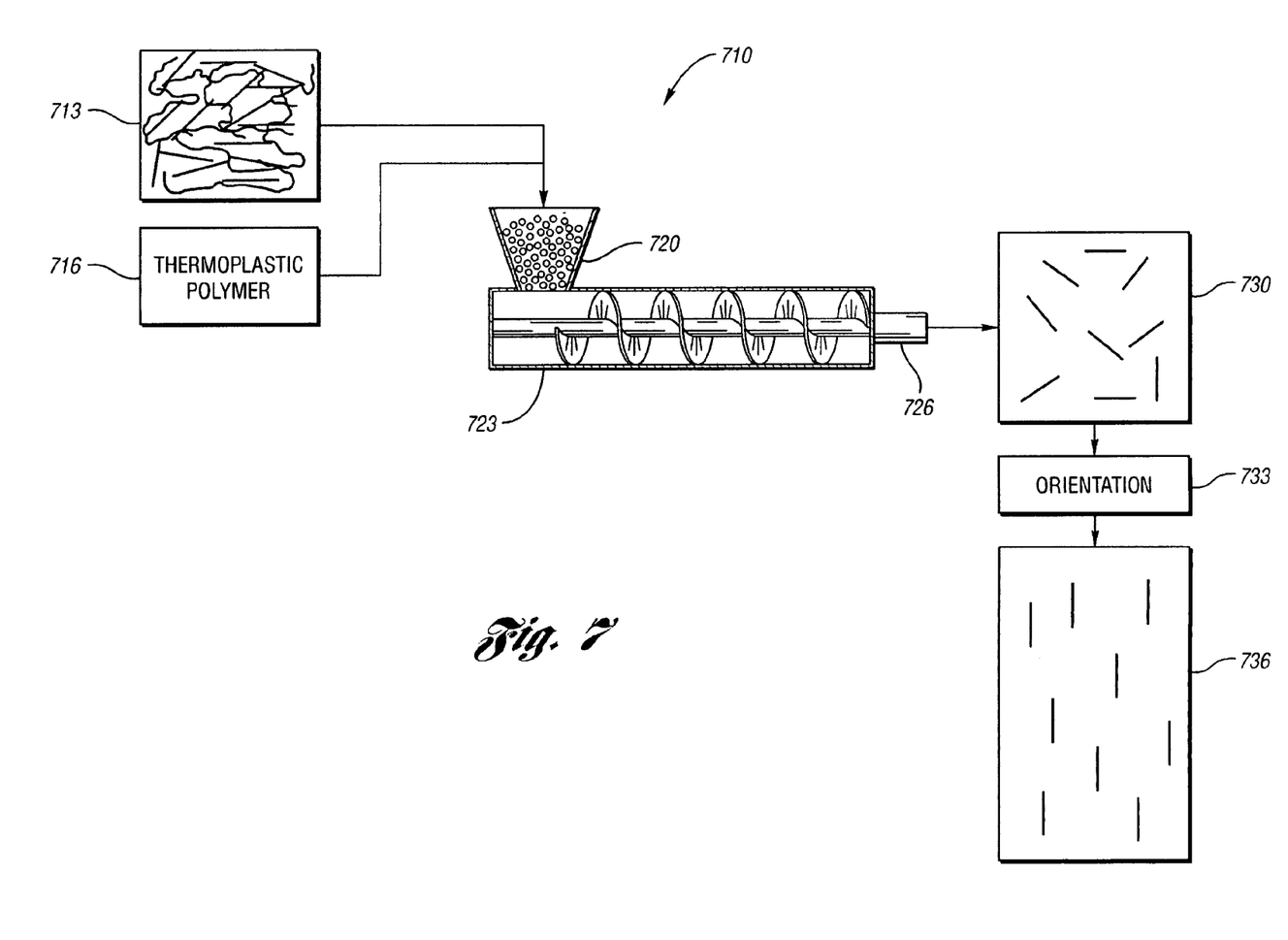
FIG. 7 is a schematic diagram of a process for mixing delaminated particles to prepare reinforced polymers.

For example, FIG. 7 schematically illustrates a process 710 of mixing delaminated particles within a polymer and then applying an external field to the resulting reinforced polymer. As shown, delaminated particles 713 and thermoplastic resins 716 are deposited in hopper 720 to feed extruder 723. The particles and resins are mixed in extruder 723 and are shaped based on the configuration of shaping die 726. In this embodiment, the delaminated particle-polymer nanocomposites are formed into a film 730. The film 730 then undergoes a shear flowing process 733 to shear the film and orient the delaminated particles within the polymer as indicated by reference numeral 736.

In use, the particle-polymer nanocomposites may be applied to form interior and exterior parts of a vehicle, e.g., interior trim panels, while requiring less weight than a typical vehicle part made by prior art technology. The particle-polymer nanocomposites of the present invention allows parts to be relatively lighter in weight than previous parts, while providing the same or better mechanical properties. Moreover, the particle-polymer nanocomposites containing the delaminated particles experiences increased thermal conductivity of the polymer. The particle-polymer nanocomposites also enhances fire retardation. Additionally, due to the dimensional features of the particles, barrier properties of polymers are also enhanced, providing increased resistance to permeation. This provides the capability of using such particle-polymer nanocomposites as barrier products, e.g., fuel tanks. Furthermore, also due to the dimensional features of the particles, scratch resistant properties of polymers are enhanced, providing less manifestation of marks or scores placed on a product of the present invention.

Also, the delaminated structure in accordance with the present invention may be used in other applications, in addition to polymer reinforcement. For example, the delaminated particles may be used in catalyst supports and anisotropic colloidal particles, to name a few.

It is to be noted that a near-critical fluid may be used in replacement of the supercritical fluid discussed above. It is also understood that substantially supercritical fluids may include near-critical fluids or supercritical fluids.

EXAMPLE

This example provides a method of delaminating aggregated particles of natural silicate, nanoplatelet, nanofiber, or nanotube structures to be used in enhancing the properties of polymers. In this example, a sample of clay silicates Na+-montmorillonite in dry powdered form, high-pressurized carbon dioxide gas, and a sample of PDMS at 38900 weight average molecular weight were provided. The sample of clay silicates (Cloisite Na+) were provided by Southern Clay Products. Cloisite Na+ is a natural montmorillonite with cation exchange capacity of 92.6 meq/100 g clay. The sample comprised about 2.0 grams of 0.5 to 4 µm sized clay silicates. The clay silicates comprised layered particles having perpendicular spacing between each other of about 10 to 15 angstroms. The weight ratio of the particles to PDMS was about 1:1. The samples of clay silicates and PDMS were placed in a glass vial. A porous membrane was used as a lid to close the glass vial. The glass vial containing the clay silicates and the PDMS was placed in a 100-milliliter high-pressure single compartment vessel. The vessel was capable of being isolated from the atmosphere by security clamps and ring. The vessel was in fluid communication with the high-pressure carbon dioxide by way of piping means and limited by valves. A heating jacket was disposed about the vessel to achieve and maintain the critical temperature of carbon dioxide.

When the vessel was isolated, the high-pressurized carbon dioxide was introduced therein and maintained at about 7.58 MPa. Then, the vessel was heated to about 70 degrees Celsius at which the supercritical conditions of carbon dioxide were achieved and maintained for about 3 hours, thereby solubilizing the PDMS in the carbon dioxide and diffusing between the particles with the PDMS within the supercritical carbon dioxide.

After about 3 hours, the vessel was immediately depressurized at a rate of about 3 milliliters per second, thus catastrophically lowering the pressure within the vessel. This was accomplished by opening a connected blow-off valve of the vessel. As a result, delaminated particles were formed having PDMS precipitated out and deposited about the delaminated particles.

While various embodiments for carrying out the invention have been described in detail, those familiar with the art to which this invention relates will recognize various alternative designs and embodiments for practicing the invention as defined by the following claims.

The invention claimed is:

1. A method of delaminating aggregated particles of natural silicate, nanoplatelet, nanofiber, or nanotube structures, the method comprising:
   diffusing a coating agent in a substantially supercritical fluid between the aggregated particles; and
   catastrophically depressurizing the substantially supercritical fluid to form delaminated particles.

2. The method of claim 1 further comprising processing the delaminated particles with a polymer to form delaminated particle-polymer nanocomposites.

3. The method of claim 2 wherein processing the delaminated particles with the polymer includes extruding, molding, melt mixing, solution casting, compounding, fiber spinning, supercritical fluid processing or combinations thereof.

4. The method of claim 1 wherein the coating agent comprises a polymer, an oligomer, a monomer, or an oil or a mixture thereof.

5. The method of claim 2 wherein the polymer is a miscible or immiscible polymer relative to the coating agent.

6. The method of claim 2 wherein the substantially supercritical fluid comprises carbon dioxide, methane, ethane, nitrogen, argon, nitrous oxide, alkyl alcohols, ethylene propylene, propane, pentane, benzene, pyridine, water, ethyl alcohol, methyl alcohol, ammonia, sulfur hexaflouride, hexafluoroethane, fluoroform, chlorotrifluoromethane, or mixtures thereof.

7. The method of claim 1 further comprising applying an external field to orient the delaminated particles.

8. The method of claim 7 wherein applying the external field includes shear flowing, extensional flowing, mechanical procuring, electrical field procuring, or magnetic field procuring.

9. The method of claim 8 wherein applying the external field includes orienting the delaminated particles in an uniaxial or multiaxial flow.

10. The method of claim 1 wherein the aggregated particles are in the form of powder with an average aggregated size of between about 2 nanometer and 1 millimeter.

11. The method of claim 1 wherein diffusing the substantially supercritical fluid and the aggregated particles is performed for a time between about 10 minutes to 24 hours.

12. The method of claim 1 wherein catastrophically depressurizing the contacted particles is performed in between about 5 and 30 seconds.

13. The method of claim 1 wherein catastrophically depressurizing the contacted particles comprises exfoliating the contacted particles and reducing reaggregation of the structures.

14. The method of claim 1 the weight ratio of the aggregated particles to the coating agent is at least about 1:0.1.

15. A method of preparing a reinforced polymer, the method comprising:
   diffusing a coating agent in a substantially supercritical fluid between aggregated particles of silicate, nanoplatelet, nanofiber, or nanotube structures defining contacted particles;
   catastrophically depressurizing the substantially supercritical fluid to form delaminated particles; and
   processing the delaminated particles with a polymer to form delaminated particle-polymer nanocomposites defining the reinforced polymer.

16. A method of preparing a reinforced polymer, the method comprising:
   diffusing aggregated particles of a silicate, nanoplatelet, nanofiber, or nanotube structures with a coating agent solubilized in a substantially supercritical fluid to intercalate the coating agent between the aggregated particles defining contacted particles;
   catastrophically depressurizing the contacted particles to exfoliate the contacted particles and reduce reaggregation of the structures, the coating agent being precipitated from the substantially supercritical fluid and deposited on the contacted particles during depressurization defining delaminated particles; and
   processing the delaminated particles with a miscible polymer or an immiscible polymer to form delaminated particle-polymer nanocomposites defining the reinforced polymer.

17. The method of claim 16 further comprising applying an external field to orient the delaminated particles.

18. A method of preparing a reinforced polymer, the method comprising:
   diffusing aggregated particles of a silicate, nanoplatelet, nanofiber, or nanotube structures with a coating agent solubilized in a substantially supercritical fluid to intercalate the coating agent between the aggregated particles defining contacted particles;
   catastrophically depressurizing the contacted particles to exfoliate the contacted particles and reduce reaggregation of the structures, the coating agent being precipitated from the depressurized fluid and deposited on the contacted particles during depressurization, defining delaminated particles;
   processing the delaminated particles with one of a miscible polymer or an immiscible polymer to form delaminated particle-polymer nanocomposites; and
   applying an external field to orient the delaminated particles in the film, fiber, molded parts, defining the reinforced polymer.

* * * * *

UNITED STATES PATENT AND TRADEMARK OFFICE
CERTIFICATE OF CORRECTION

PATENT NO. : 7,387,749 B2 Page 1 of 1
APPLICATION NO. : 10/783060
DATED : June 17, 2008
INVENTOR(S) : Esin Gulari et al.

It is certified that error appears in the above-identified patent and that said Letters Patent is hereby corrected as shown below:

In the Specification

Col. 1, line 6, before "FIELD OF THE INVENTION", please insert the following paragraph:

--FEDERALLY SPONSORED RESEARCH AND DEVELOPMENT

This invention was made with government support under Contract No. CTS-0335315 awarded by the U.S. National Science Foundation. The U.S. government may retain certain rights to the invention.--

Signed and Sealed this

Fourteenth Day of July, 2009

JOHN DOLL
*Acting Director of the United States Patent and Trademark Office*